(No Model.)  4 Sheets—Sheet 1.

E. B. KELSEY.
MACHINE FOR SETTING OR MOLDING THE EDGES OF BOOT OR SHOE SOLES.

No. 299,145.  Patented May 27, 1884.

Witnesses.
S. N. Piper
E. B. Pratt

Inventor.
Edmund Birk Kelsey,
by R. H. Eddy, atty.

(No Model.) 4 Sheets—Sheet 2.

E. B. KELSEY.
MACHINE FOR SETTING OR MOLDING THE EDGES OF BOOT OR SHOE SOLES.

No. 299,145. Patented May 27, 1884.

Witnesses.
S. N. Piper
E. B. Pratt

Inventor.
Edmund Birk Kelsey.
by R. H. Eddy atty.

(No Model.) 4 Sheets—Sheet 3.
E. B. KELSEY.
MACHINE FOR SETTING OR MOLDING THE EDGES OF BOOT OR SHOE SOLES.
No. 299,145. Patented May 27, 1884.
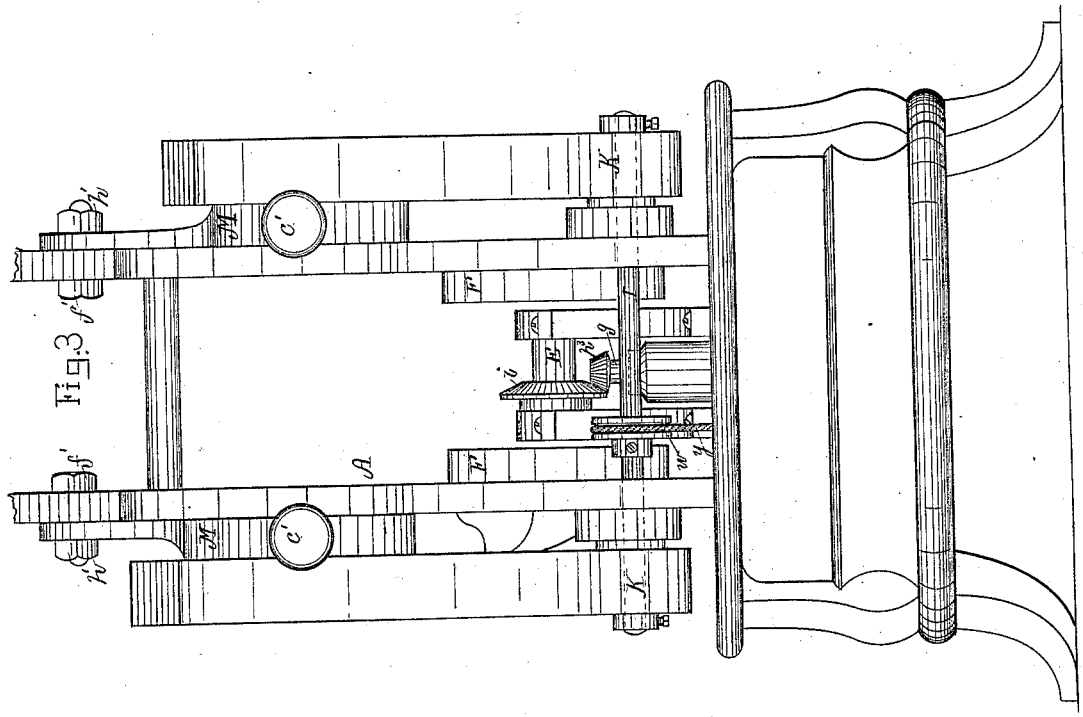
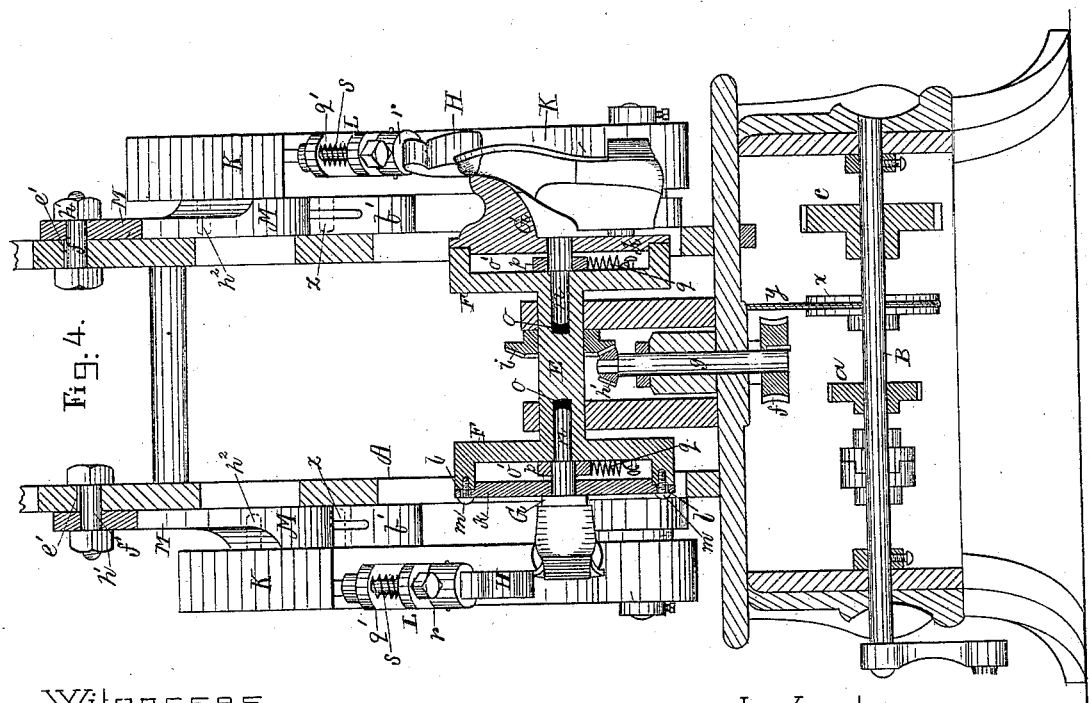
Witnesses.
S. N. Piper
E. B. Pratt
Inventor.
Edmund Birk Kelsey,
by R. H. Eddy atty.

(No Model.) 4 Sheets—Sheet 4.
E. B. KELSEY.
MACHINE FOR SETTING OR MOLDING THE EDGES OF BOOT OR SHOE SOLES.

No. 299,145. Patented May 27, 1884.

Witnesses.
S. N. Piper
E. B. Pratt

Inventor.
Edmund Birk Kelsey
by N. H. Eddy atty.

UNITED STATES PATENT OFFICE.

EDMUND BIRK KELSEY, OF BEVERLY, MASSACHUSETTS.

MACHINE FOR SETTING OR MOLDING THE EDGES OF BOOT OR SHOE SOLES.

SPECIFICATION forming part of Letters Patent No. 299,145, dated May 27, 1884.

Application filed March 14, 1884. (No model.)

*To all whom it may concern:*

Be it known that I, EDMUND BIRK KELSEY, of Beverly, in the county of Essex, of the Commonwealth of Massachusetts, have invented a new and useful Improvement or Machine for "Setting" or Molding the Edges of Soles of Boots or Shoes; and I do hereby declare the same to be described in the following specification and represented in the accompanying drawings, of which—

Figure 1:
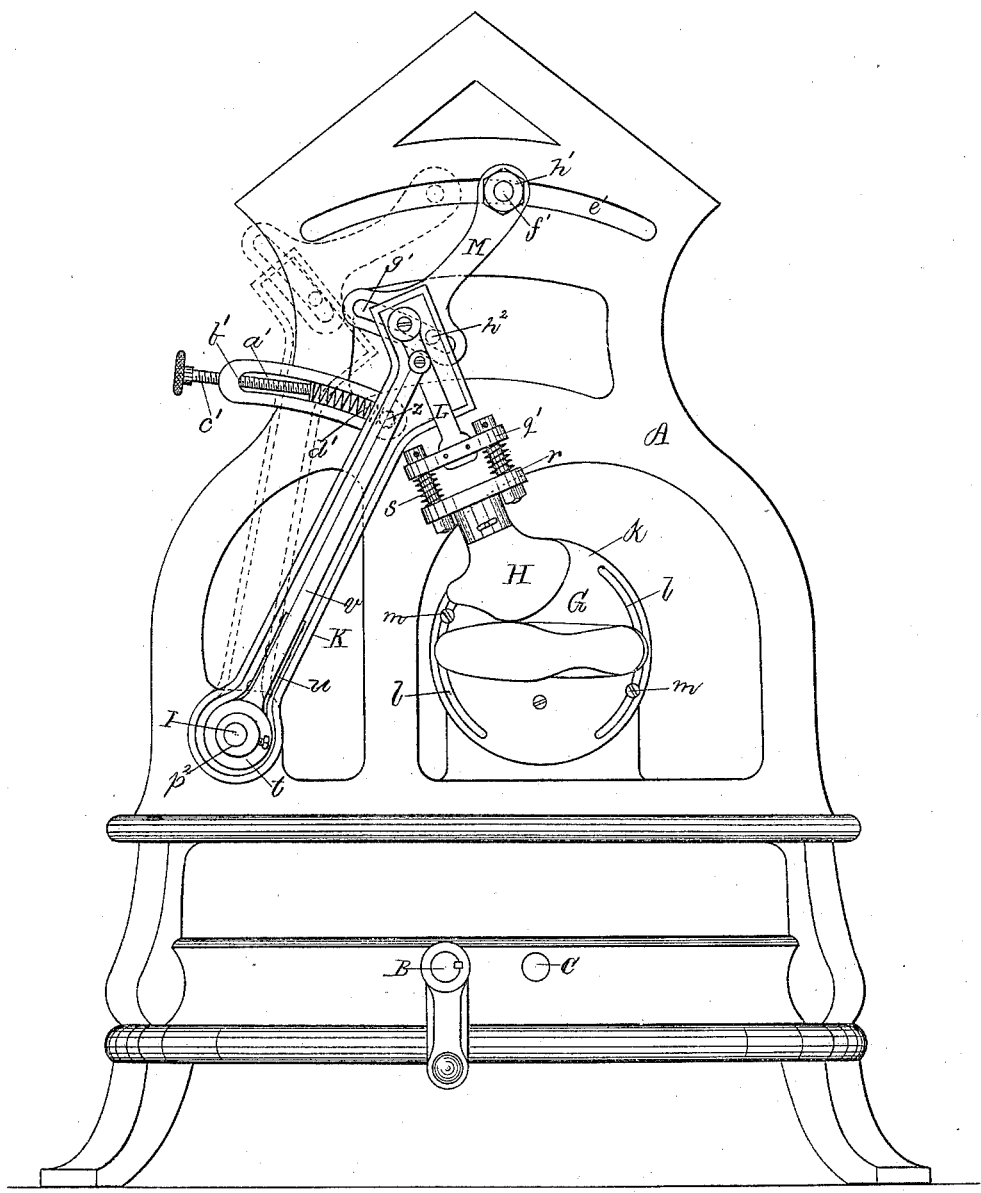
Figure 2:
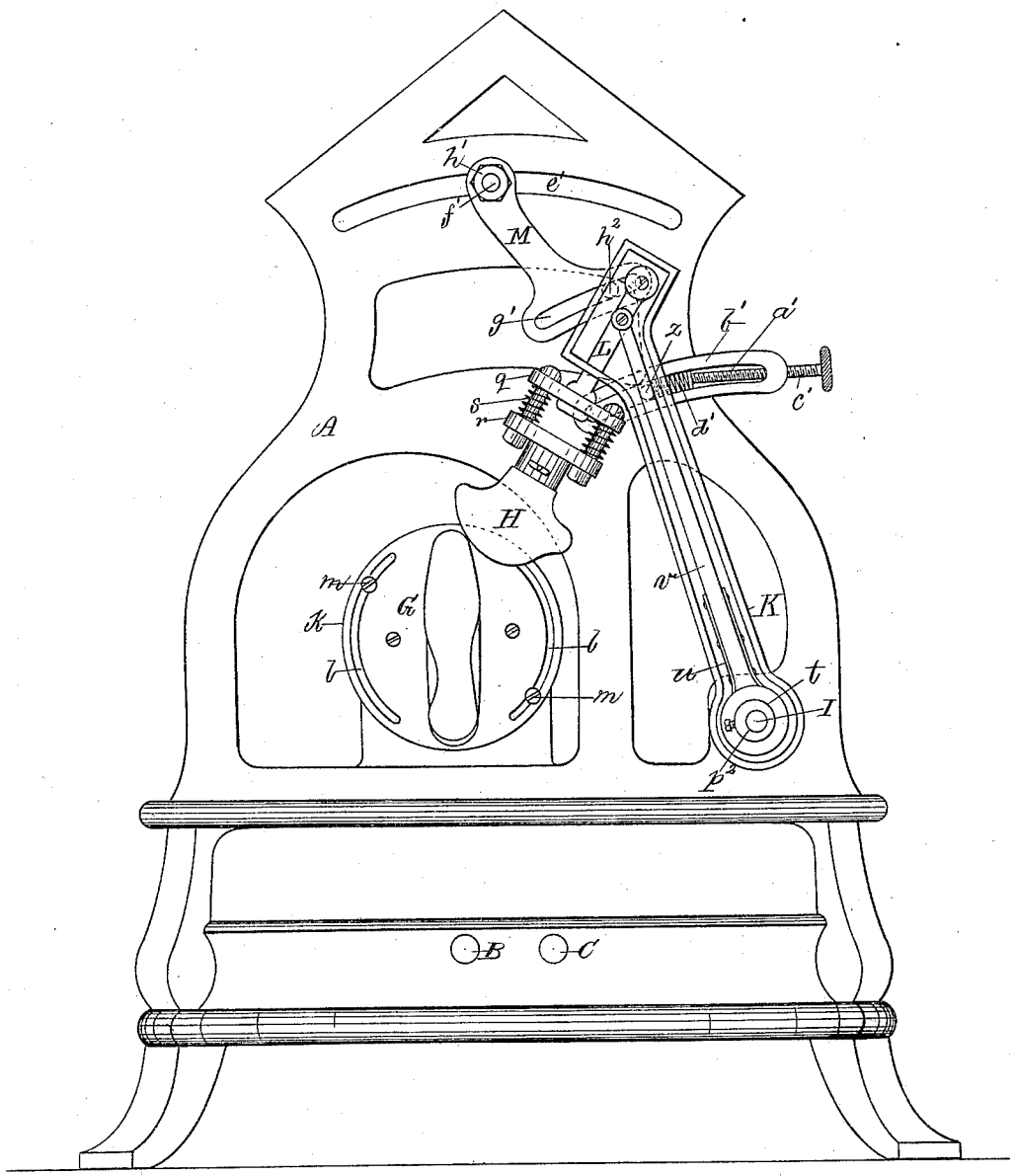
Figure 5:
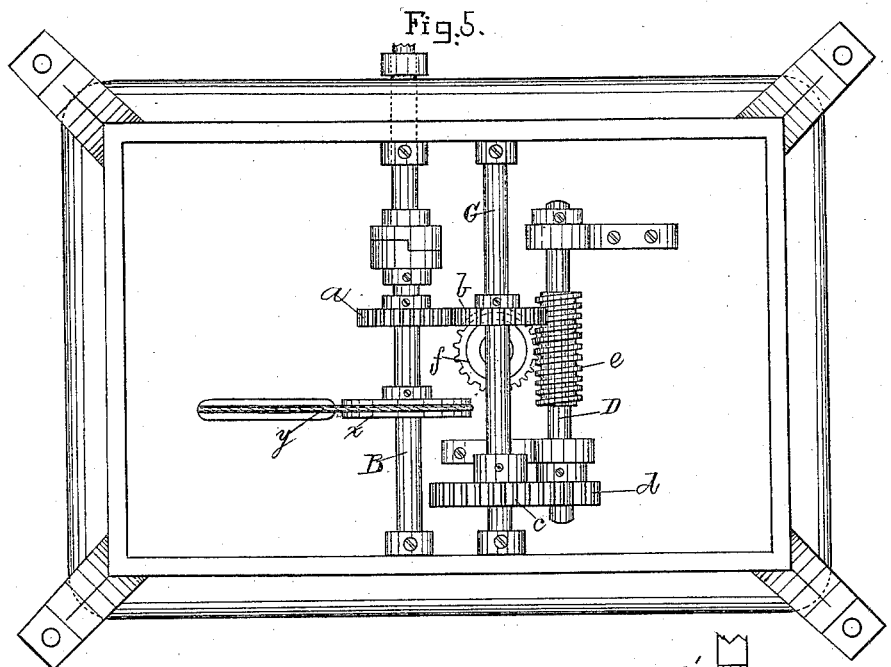
Figure 6:
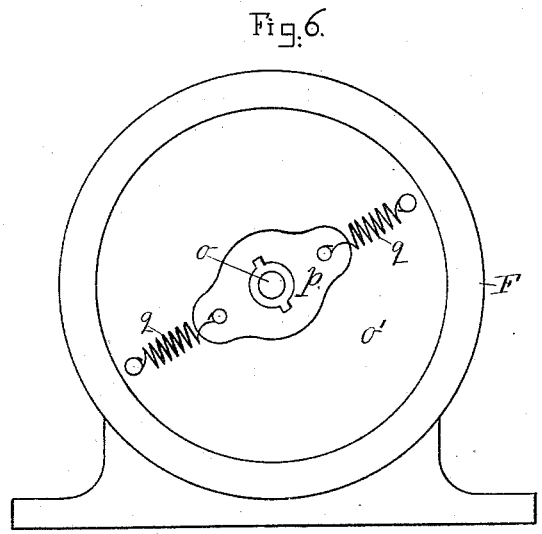
Figure 7:
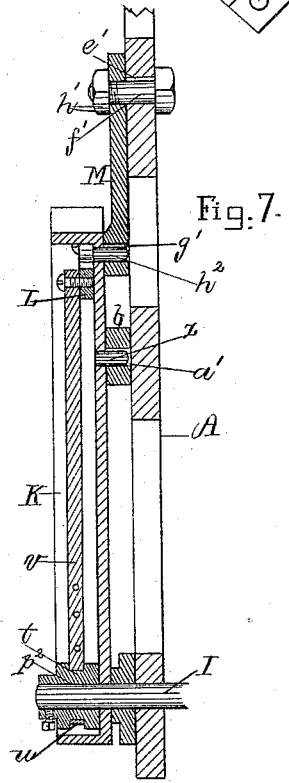

Figures 1 and 2 are opposite side views; Fig. 3, an end elevation; Fig. 4, a transverse section; and Fig. 5, an under side view of a machine embodying my invention, the nature of which is defined in the claims hereinafter presented. Fig. 6 is an outer side view of one of the jack-carriers and the lever and springs arranged therein. Fig. 7 is a section of the slot $e'$, the pivot $f'$, the nut $h'$, and the toggle M, hereinafter described.

The machine as represented in the said drawings is automatic, and in one sense duplex, for it will accomplish at one and the same time the setting or molding of the edges of two shoes. It may be made, however, to mold or set the edge of but one shoe at a time. Instead of a lasted shoe being held to the molding or setting mechanism and turned by the hands of an operative, as usual in various well-known shoe-sole setting-machines, this machine has mechanism for such purpose, such mechanism being an essential element of it.

In the drawings, A denotes the frame for supporting the main operative parts of the machine. Extending across the said frame, and suitably supported in bearings, is the main or driving shaft B and an auxiliary shaft, C, they having connecting-gears $a$ and $b$, to enable the auxiliary shaft to be revolved by and with the primary one. On the shaft C there is applied a gear, $c$, that engages with a pinion, $d$, fixed on a screw or worm-threaded shaft, D, arranged as represented. The screw $e$ of said shaft D engages with a worm-gear, $f$, fixed on an upright shaft, $g$, upon whose upper end is a bevel-pinion, $h'$, to engage with a bevel-gear, $i$, carried by a horizontal shaft, E. On the shaft E, at its ends, are fixed two shoe-jack carriers, F, each of which is a wheel or cylinder, chambered at its outer side, and having against such side the carrier base-plate $k$ of a shoe-jack, G. This base-plate has arranged concentrically in it two curved slots, $l\, l$, through which screws $m$ pass and screw into the carrier F. From this it will be seen that the base-plate, while held to the carrier, can be partially revolved. At the center of the base-plate is a journal, $n$, that extends into a bearing, $o$; in the carrier F, there being fixed on it the said journal, and in the chamber $o'$ of the carrier a lever, $p$, to the arms of which and to the carrier spiral springs $q\, q$ are attached, the said lever and springs being shown particularly in Fig. 6. By means of the lever and springs the jack is adapted to yield more or less on the carrier while being revolved thereby, such being to prevent breakage or injury to the shoe or jack when the pressure of the molding or setting tool on the shoe may be sufficient to overcome the resistance effected by the friction of the base of the jack against its carrier. To cause the jack to revolve with the carrier against the pressure of the tool on the sole-edge, the screws $m$ are to be set up to the necessary extent; but should the said pressure cause the sole-edge to be indented, so as to prevent the shoe-jack from revolving with the carrier, the lever and springs of the jack will allow such jack to yield to the pressure of the tool, so as to enable the shoe to pass the tool without injury to the shoe or the jack.

The setting or molding tool for each jack, or a shoe when thereon, is shown at H.

The next portions of the machine to be described are the mechanisms for supporting each molding-tool and pressing it against a sole of a shoe on a last carried by the jack, and for imparting to such tool reciprocating or vibratory motions while it is in contact with the sole and such sole may be in slow revolution.

Extending across the frame A is another shaft, I, which goes through the pivot $p^2$ of each tool-supporting arm K. Each arm K, pivoted to the side of the frame and arranged as shown, has within it and extending down from it a pendulous tool-carrier, L, adapted to swing or vibrate. This tool-carrier is in two parts, $q'$ and $r$, suitably connected, and having springs $s\ s$ between them, in order to enable the lower part carrying the tool to yield, or the tool to have a yielding pressure on the sole-edge. The tool is adapted or pivoted to its carrier, so as to be capable of turning horizontally, or thereabout, therein, in order for the tool to accommodate itself to the curve of the edge of the sole. There is fixed on the shaft I, within each arm K, an eccentric, $t$, from whose yoke $u$ a rod, $v$, extends to and is pivoted to the pendulous tool-carrier L. Furthermore, there is fixed on the shaft I, at its middle, a pulley, $w$, about which and pulley $x$ on the driving-shaft is an endless belt, $y$. From the above it will be seen that the shaft I will be revolved by the pulleys and belt when the driving-shaft is put in revolution, and, as a consequence, a vibratory motion will be imparted to each tool-carrier L, and, of course, to its tool. From each arm K a stud, $z$, projects into a curved groove, $a'$, of a guide, $b'$, secured to the side of the frame A. A screw, $c'$, is screwed into the guide, and extends into and bears against a spiral spring, $d'$, arranged in the groove $a'$, and to rest against the stud $z$. This spring is to press the arm K toward the jack, to cause the tool to bear with sufficient force against the sole-edge, the extent of pressure being regulated or determined by means of the screw $c'$. A curved slot, $e'$, arranged as shown in the frame A, has extending through it the pivot $f'$ of a flat toggle, M, having within it, as represented, a curved slot, $g'$, into which a stud or pin, $h^2$, from the arm K is extended. The said pivot $f'$ is a headed screw, which goes through the toggle, and is screwed into a nut, $h'$. By setting up the nut the toggle may be clamped in position. By moving the toggle M and the arm K backward into positions as shown by dotted lines in Fig. 1, the toggle will serve to hold the arm back in its position, as occasion may require. The toggle, when formed as shown in full lines, operates to steady the arm.

To use the machine, a shoe properly lasted is to have its last supported by the jack, the molding-tool being against the edge of the sole. This having been accomplished, on the driving-shaft being put in revolution the jack with the shoe will be slowly revolved, and the tool will be borne and vibrated against the edge of the sole, and will set or mold such edge while it may be in revolution.

I am aware that before my invention a sole-edge trimming and burnishing machine has been provided with a jack and a cutter and burnisher, revoluble automatically, such being as described in the United States Patent No. 142,756; also, that before my invention there were machines, each of which had its jack revoluble by hand, while its burnisher had mechanism for reciprocating it automatically, and mechanism for pressing it, by means of the foot of an attendant, on the sole-edge, such being shown in the United States Patents Nos. 131,425 and 147,551, all of which differ from my invention, wherein the jack has mechanism for automatically revolving it, and the setting or molding tool has mechanism for pressing and vibrating it against the sole-edge.

I claim—

1. The combination of the jack provided with mechanism for automatically revolving it, with the setting or molding tool having mechanism, substantially as described, for pressing and vibrating it against the edge of a shoe-sole while in revolution by means of the jack.

2. The combination of the two jacks applied to one shaft, having mechanism for automatically revolving it, with the two setting or molding tools having to each mechanism, substantially as described, for pressing and vibrating it against the edge of a sole while in revolution by means of the jack supporting the last carrying the shoe of such sole.

3. The combination of the toggle M, adapted to the frame A by mechanism, substantially as described—viz., the headed screw, its nut, and the curved slot in the frame—with the arm K, pivoted to the frame, and provided with the vibratory tool-carrier and operative mechanism thereof, all being substantially as described.

4. The jack having slots in it, substantially as described, and pivoted to its carrier and connected thereto by clamp-screws, and a lever and springs, all being substantially as set forth.

EDMUND BIRK KELSEY.

Witnesses:
R. H. EDDY,
E. B. PRATT.